Patented July 21, 1931

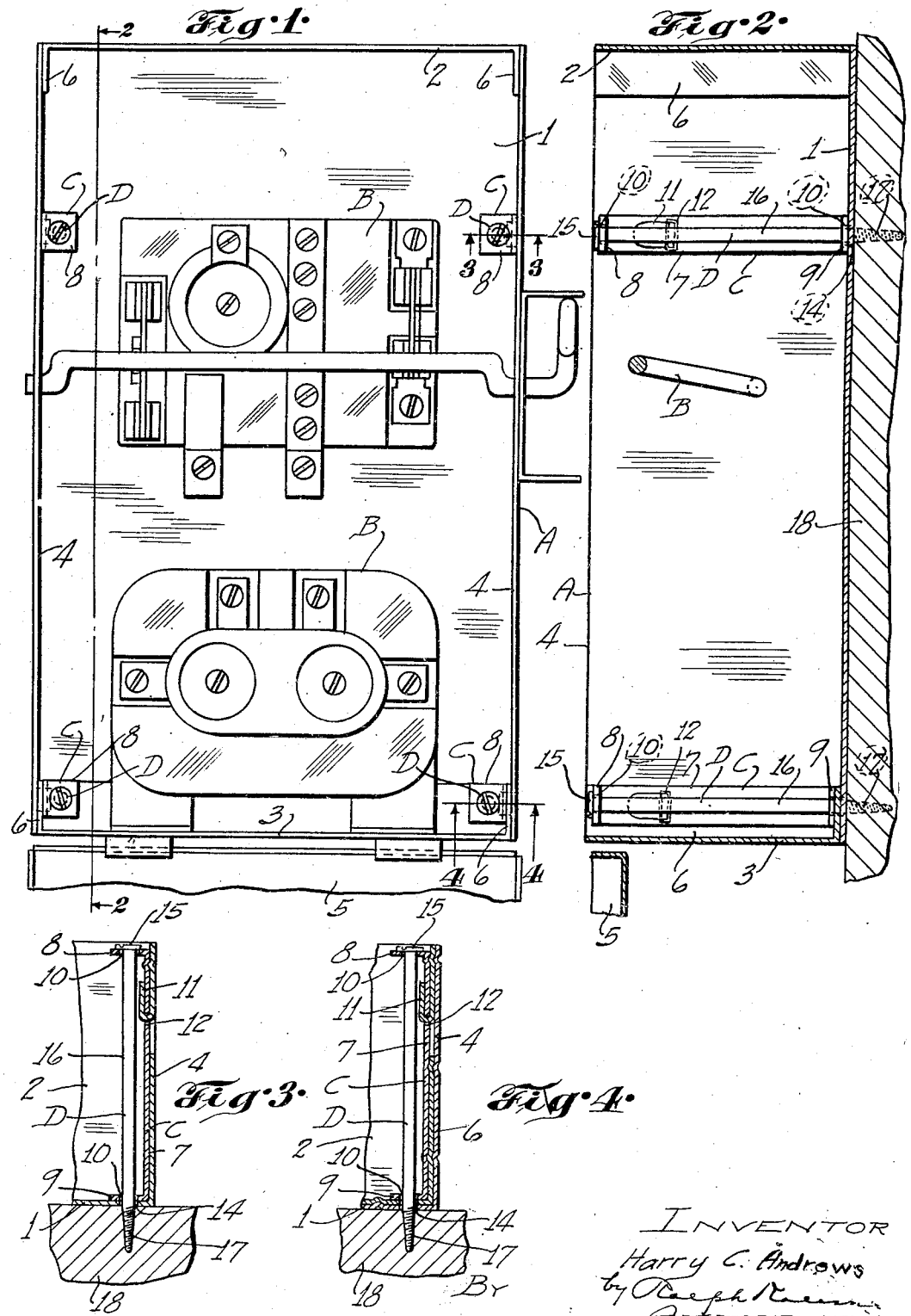

1,815,393

UNITED STATES PATENT OFFICE

HARRY C. ANDREWS, OF ST. LOUIS, MISSOURI, ASSIGNOR TO KILLARK ELECTRIC MANUFACTURING COMPANY, OF ST. LOUIS, MISSOURI, A CORPORATION OF MISSOURI

WALL-BOX FOR ELECTRICAL DEVICES

Application filed August 9, 1928. Serial No. 298,561.

This invention relates generally to wall-boxes for housing electric devices and the like and, more particularly, to a certain new and useful improvement in means for attaching or securing the box upon a wall or other support. In the electrical art, wall boxes are commonly used to enclose and support switches, fuse blocks, or other electrical apparatus and devices, and, so far as I am aware, screws, nails, or other like fastening members are usually passed through the rear wall of the box only to attach the box and its contained apparatus to the contiguous supporting structure, usually a wall, partition, panel, or like commonly vertically disposed structural member. Heretofore, the fasteners have been disposed in upper and lower groups for direct bearing of one or the head-end thereof against the rear wall of the box, in which construction the operative ends of the fasteners are located in a relatively inaccessible position behind the apparatus or devices contained or housed in the box, with the result that considerable labor is required and considerable time is consumed in fastening the box in position. Furthermore, since the box tends to pivot about the lower group of fasteners and impose a pulling effect or tension on the upper group of fasteners, in addition to the normal gripping tension, and since also such fasteners commonly contact only one bearing surface, that is to say, the rear wall of the box, the effect of such construction is to impose a combined transverse and longitudinal shear at the junction of the head with the body of the fastener.

My present invention has hence for its prime object the provision on the box of means, associated with an improved type of fastening-element, for disposing the operative end of the latter near the front of the box in a readily accessible position.

My invention has for another object the provision on the box of a plurality of longitudinally spaced bearing members for the fastening elements, whereby the weight of the box and its contents is in transverse shear on the body of the fastener, the head of the latter being thus subjected only to the tension or longitudinal shear incident to securing the box to the wall.

My invention has for a further object the provision on the box of a frame or bracket receptively associated with the fastener and secured to the side wall of the box in a simple, rigid manner, devoid of screws or the like.

My invention has for a still further object the provision generally of a wall-box of simple, compact structure, which may with convenience, speed, and economy be rigidly and securely fixed upon the wall or other support.

And with the above and other objects in view, my invention resides in the novel features of form, construction, arrangement, and combination of parts hereinafter described and pointed out in the claims.

In the accompanying drawings,

Figure 1 is a plan view of a wall box embodying my invention, a fragmentary portion of the cover of the box being shown in open position and certain electrical fittings or apparatus being shown in illustrative contained association with the box;

Figure 2 is a longitudinal sectional view of the box taken approximately along the line 2—2, Figure 1; and Figures 3 and 4 are detail sectional views on, respectively, the lines 3—3 and 4—4, Figure 1.

Referring now more particularly and by reference characters to the drawings, which illustrate a preferred form of my invention, A designates a wall-box having contained electrical apparatus, generally indicated as B, which latter may embody any form or type of electrical device or devices customary in the art, though, for illustrative purposes, there is shown a fuse block and a switch unit, both being well known in the art and not constituting a part of the present invention. Preferably the box A is of rectangular formation and includes a rear wall 1, end walls 2, 3, side walls 4, and a hinged cover 5, all preferably constructed of suitable sheet metal. Preferably the side walls 4 are flanged integral continuations of rear wall 1, the end walls 2, 3, being flanged at their ends, as at 6, and set between and suitably, as by spot-welding, united or joined to the adjacent side walls 4, as shown.

Disposed adjacent the corners, and preferably spot-welded or otherwise fixed to the contiguous side walls 4, of box A, are fastening frames or brackets C approximately coextensive with the depth of the wall-box or the width of the side-walls 4, each bracket preferably including a body or wall engaging strip 7 formed at its opposite ends with inturned ends or flanges providing lugs 8, 9, apertured in registration or alignment, as at 10, for freely receiving the fastening element or drive-screw D presently to be described. As so fixed to the box, the bracket-strips 7 are disposed flatwise against the opposite side walls 4, with the lugs 8, 9, disposed against the outer or free margin of the side wall 4 and the rear wall 1, respectively, as shown; and struck in from the side walls 4 and suitably located for gripping the respective frames C, are tongues or bendable fastening elements 11 each passed through a suitably provided slot or opening 12 in the body-strip 7 of the frame C preferably near the outer end thereof, each such element or tongue 11 being crimped or bent over on its conjoined wall 4 to grip the body-strip 7 of the frame C securingly therebetween, as best seen in Figure 3, and thereby re-inforce the connection between the box A and its said supporting-brackets C. As best seen, however, in Figures 1 and 4, some of the frames or brackets C may be disposed contiguous to the inturned flanged portions 6 of one of the end walls 3, in which case the tongues 11 may be conveniently struck in from said flanged portions 6, as shown in Figure 4.

Preferably the inner lug or flange, as 9, of the frame C rest upon the rear wall 1 of the box A, although it is obvious that the lug or flange 9 may be spaced from said wall 1 if desired, the latter having a screw-receiving aperture 14 alined or registering with the apertures 10 in the lugs 8, 9.

Having a preferably flattened operative head 15 channelled or otherwise adapted for cooperation with a suitable driving tool for contacting and bearing against the lug 8 of the frame C, is a fastening element or drive screw D, having an elongated body-member or shank portion 16 adapted to be passed through the alined apertures 10, 10, and 14, and terminating in a preferably wood screw portion 17 for threaded engagement with a suitable supporting structure, as a wall 18 (Figures 2, 3, and 4).

In the use of the box, the box A is suitably located on the wall 18, the several drive screws D are disposed through their respective frames C as described and hammered or otherwise driven into said wall 18 and finally screwed tightly therein to set the box A firmly and securely to the wall. It may be stated here that the lug 8 of each frame C is located a distance from the outer margin of the box A to permit the top of the head 15 of the screw D to finally come just inside of the plane of the open side of the box, where it is easily accessible. The body portion of the screw D is preferably coextensive with the depth of the box, thus at the commencement of the driving operation the head 15 may be readily struck by a hammer to initially drive the screw into the wall. It will be readily seen that the lugs 8, 9 form spaced bearing members for the body of the screw D to sustain the box A thereon substantially in transverse shear only. Thus the brackets C not only conveniently facilitate and reduce the time and labor required in the attachment of the box A to its support, but also provide members adapted, in co-operation with the fastening elements D, for securing the box A with rigidity, firmness, and permanency upon the supporting-structure.

While the frames C may be employed in connection with bolts or like devices, it is preferable to use fastening elements or drive screw D as hereinbefore described, the association of the frames C with the drive-screws D forming a combination particularly adapted in removing the present difficulties and in accomplishing the objects intended and set forth.

It is to be understood that changes in the form, construction, arrangement, and combination of the several parts of my new box and its securing means may be made and substituted for those herein shown and described without departing from the nature and principle of my invention.

Having thus described my invention, what I claim and desire to secure by Letters Patent is:

1. In a fastening means for a wall-box, a fastening element having its support-engaging end passed through the rear wall of the box and its head end disposed adjacent to the plane of the open end of the box, in combination with a member including a body-portion contiguous to a wall of the box having inturned end portions provided with aligning fastener-receiving apertures, one of said end portions being disposed for bearing engagement with the head of said fastening element, and means incorporated with said box-wall bendable thereover for engaging said body-portion therebetween.

2. A fastening means for an electrical device wall-box comprising, in combination, a support-engaging fastening element having its head disposed within and adjacent to and presented toward the open side of the box, said element being of a length to extend rearwardly of the box and through the rear wall thereof into the support, and means fixed to and disposed within the box adjacent the front thereof for sustaining the box on the fastening element.

3. A fastening means for an electrical device wall-box comprising, in combination, a support-engaging fastening element having its head disposed within and adjacent to and presented toward the open side of the box, said element being of a length to extend rearwardly of the box and through the rear wall thereof into the support, and means including spaced bearings fixed to and disposed within the box engaging the fastening element for sustaining the box thereon.

In testimony whereof, I have signed my name to this specification.

HARRY C. ANDREWS.